(12) United States Patent
Kollin et al.

(10) Patent No.: US 10,254,542 B2
(45) Date of Patent: Apr. 9, 2019

(54) HOLOGRAPHIC PROJECTOR FOR A WAVEGUIDE DISPLAY

(71) Applicant: Microsoft Technology Licensing, LLC, Redmond, WA (US)

(72) Inventors: Joel Steven Kollin, Seattle, WA (US); Andrew Maimone, Duvall, WA (US); Steven John Robbins, Redmond, WA (US); Eliezer Glik, Seattle, WA (US); Andreas Georgiou, Cambridge (GB); Xinye Lou, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/624,409

(22) Filed: Jun. 15, 2017

(65) Prior Publication Data
US 2018/0120563 A1    May 3, 2018

Related U.S. Application Data

(60) Provisional application No. 62/416,094, filed on Nov. 1, 2016.

(51) Int. Cl.
*G02B 27/01*   (2006.01)
*G03H 1/08*    (2006.01)
(Continued)

(52) U.S. Cl.
CPC ........... *G02B 27/0103* (2013.01); *G02B 5/32* (2013.01); *G02B 6/0023* (2013.01);
(Continued)

(58) Field of Classification Search
CPC .............. G02B 27/0172; G02B 27/017; G02B 27/0081; G02B 27/0103; G02B 27/0176;
(Continued)

(56) References Cited

U.S. PATENT DOCUMENTS 4,012,119 A    3/1977 Adams et al.
4,826,300 A    5/1989 Efron et al.
(Continued)

FOREIGN PATENT DOCUMENTS

DE    102012100201 A1    9/2012
EP         2447787 A1    5/2012
(Continued)

OTHER PUBLICATIONS

Yepes and Gesualdi, "Dynamic Digital Holography for recording and reconstruction of 3D images using optoelectronic devices", Journal of Microwaves, Optoelectronics and Electromagnetic Applications, vol. 16, No. 3, Sep. 2017, pp. 801-815. DOI: http://dx.doi.org/10.1590/2179-10742017v16i3958. (Year: 2017).*

Huebschman, et al., "Dynamic holographic 3-D image projection", In Journal of Optics Express, vol. 11, No. 5, Mar. 10, 2003, pp. 437-445.

Chuan, et al., "Holographic Projection Using Converging Spherical Wave Illumination", In Proceedings of Seventh International Conference on Image and Graphics, Jul. 26, 2013, pp. 761-765.

(Continued)

*Primary Examiner* — William R Alexander
(74) *Attorney, Agent, or Firm* — Alleman Hall Creasman & Tuttle LLP

(57) ABSTRACT

Examples are disclosed that relate to a near-eye display device including a holographic display system. The holographic display system includes a light source configured to emit light that is converging or diverging, a waveguide configured to be positioned in a field of view of a user's eye, and a digital dynamic hologram configured to receive the light, and project the light into the waveguide such that the light propagates through the waveguide.

20 Claims, 6 Drawing Sheets

(51) Int. Cl.
 *F21V 8/00* (2006.01)
 *G03H 1/22* (2006.01)
 *G02B 5/32* (2006.01)
(52) U.S. Cl.
 CPC ....... *G02B 6/0028* (2013.01); *G02B 27/0172* (2013.01); *G03H 1/0866* (2013.01); *G03H 1/2205* (2013.01); *G03H 1/2249* (2013.01); *G03H 1/2294* (2013.01); *G02B 2027/0118* (2013.01); *G02B 2027/0125* (2013.01); *G02B 2027/0174* (2013.01); *G03H 1/2286* (2013.01); *G03H 2001/2207* (2013.01); *G03H 2001/2239* (2013.01); *G03H 2001/2242* (2013.01); *G03H 2001/2276* (2013.01); *G03H 2001/2284* (2013.01); *G03H 2222/31* (2013.01); *G03H 2223/12* (2013.01); *G03H 2223/16* (2013.01); *G03H 2223/23* (2013.01); *G03H 2225/33* (2013.01); *G03H 2225/52* (2013.01); *G03H 2225/60* (2013.01); *G03H 2227/02* (2013.01); *G03H 2270/55* (2013.01)
(58) Field of Classification Search
 CPC .... G02B 27/2228; G02B 27/225; G02B 5/32; G02B 5/30; G02B 5/3083; G02B 6/0035; G02B 6/005; G02B 6/0076; G02B 6/0018
 USPC .......................................................... 359/15
 See application file for complete search history.

(56) References Cited

U.S. PATENT DOCUMENTS

| | | | |
|---|---|---|---|
| 5,198,653 A | 3/1993 | Shen et al. | |
| 5,224,198 A * | 6/1993 | Jachimowicz | G02B 6/003 359/13 |
| 5,331,446 A | 7/1994 | Hirai et al. | |
| 5,715,337 A | 2/1998 | Spitzer et al. | |
| 5,815,222 A | 9/1998 | Matsuda et al. | |
| 5,907,416 A | 5/1999 | Hegg et al. | |
| 6,043,910 A | 3/2000 | Slinger | |
| 6,075,512 A | 6/2000 | Patel et al. | |
| 6,404,538 B1 | 6/2002 | Chen et al. | |
| 6,480,307 B1 | 11/2002 | Yang | |
| 6,512,560 B2 | 1/2003 | Ohtake et al. | |
| 6,512,566 B1 | 1/2003 | Yamagishi et al. | |
| 6,690,447 B1 | 2/2004 | Stephenson et al. | |
| 6,760,135 B1 | 7/2004 | Payne et al. | |
| 7,068,910 B2 | 6/2006 | Duine et al. | |
| 7,253,799 B2 | 8/2007 | Lee et al. | |
| 7,845,841 B2 | 12/2010 | Sampsell | |
| 7,876,405 B2 | 1/2011 | Ito et al. | |
| 7,976,208 B2 | 7/2011 | Travis | |
| 8,218,211 B2 | 7/2012 | Kroll et al. | |
| 8,233,204 B1 | 7/2012 | Robbins et al. | |
| 8,477,425 B2 | 7/2013 | Border et al. | |
| 8,487,980 B2 | 7/2013 | Kroll et al. | |
| 8,547,615 B2 | 10/2013 | Leister | |
| 8,553,302 B2 | 10/2013 | Leister | |
| 8,625,183 B2 | 1/2014 | Khan | |
| 8,698,705 B2 | 4/2014 | Burke | |
| 8,810,913 B2 | 8/2014 | Simmonds et al. | |
| 9,122,244 B2 | 9/2015 | Lee et al. | |
| 9,179,841 B2 | 11/2015 | Kim | |
| 9,232,172 B2 | 1/2016 | Perkins et al. | |
| 9,256,007 B2 | 2/2016 | Vasylyev | |
| 9,335,604 B2 | 5/2016 | Popovich et al. | |
| 9,341,846 B2 | 5/2016 | Popovich et al. | |
| 9,406,166 B2 | 8/2016 | Futterer | |
| 10,108,145 B2 * | 10/2018 | Awatsuji | G03H 1/0866 |
| 2003/0067760 A1 | 4/2003 | Jagt et al. | |
| 2004/0108971 A1 | 6/2004 | Waldern et al. | |
| 2004/0227703 A1 | 11/2004 | Lamvik et al. | |
| 2005/0243258 A1 | 11/2005 | Oh | |
| 2006/0028400 A1 | 2/2006 | Lapstun et al. | |

| | | | |
|---|---|---|---|
| 2007/0019264 A1 | 1/2007 | Tanijiri et al. | |
| 2008/0049450 A1 | 2/2008 | Sampsell | |
| 2009/0244415 A1 | 10/2009 | Ide | |
| 2010/0027289 A1 | 2/2010 | Aiki et al. | |
| 2010/0053771 A1 | 3/2010 | Travis et al. | |
| 2010/0056274 A1 | 3/2010 | Uusitalo et al. | |
| 2010/0073744 A1 | 3/2010 | Zschau et al. | |
| 2010/0103485 A1 | 4/2010 | Haussler | |
| 2010/0149073 A1 | 6/2010 | Chaum et al. | |
| 2010/0157399 A1 | 6/2010 | Kroll et al. | |
| 2010/0186818 A1 | 7/2010 | Okorogu et al. | |
| 2012/0013988 A1 | 1/2012 | Hutchin | |
| 2012/0062850 A1 | 3/2012 | Travis | |
| 2012/0105310 A1 | 5/2012 | Sverdrup et al. | |
| 2012/0105765 A1 | 5/2012 | Kawai et al. | |
| 2012/0120467 A1 | 5/2012 | Gruhlke et al. | |
| 2012/0188791 A1 | 7/2012 | Voloschenko et al. | |
| 2013/0022222 A1 | 1/2013 | Zschau et al. | |
| 2013/0050186 A1 | 2/2013 | Large et al. | |
| 2013/0051730 A1 | 2/2013 | Travers et al. | |
| 2013/0181888 A1 | 7/2013 | Kuriya et al. | |
| 2013/0201094 A1 | 8/2013 | Travis et al. | |
| 2013/0202297 A1 | 8/2013 | Martinelli et al. | |
| 2013/0222384 A1 | 8/2013 | Futterer | |
| 2013/0329301 A1 | 12/2013 | Travis | |
| 2014/0033052 A1 | 1/2014 | Kaufman et al. | |
| 2014/0063054 A1 | 3/2014 | Osterhout et al. | |
| 2014/0104618 A1 | 4/2014 | Potsaid et al. | |
| 2014/0104664 A1 | 4/2014 | Lee et al. | |
| 2014/0104665 A1 | 4/2014 | Popovich et al. | |
| 2014/0140653 A1 | 5/2014 | Brown et al. | |
| 2014/0140654 A1 | 5/2014 | Brown et al. | |
| 2014/0146394 A1 | 5/2014 | Tout et al. | |
| 2014/0160543 A1 | 6/2014 | Putilin et al. | |
| 2014/0168735 A1 | 6/2014 | Yuan et al. | |
| 2014/0375542 A1 * | 12/2014 | Robbins | G02B 27/0176 345/156 |
| 2015/0016777 A1 | 1/2015 | Abovitz et al. | |
| 2015/0036199 A1 | 2/2015 | Leister et al. | |
| 2015/0085331 A1 | 3/2015 | Chae | |
| 2015/0235448 A1 | 8/2015 | Schowengerdt | |
| 2015/0241844 A1 | 8/2015 | Horikawa | |
| 2015/0277123 A1 | 10/2015 | Chaum et al. | |
| 2015/0277375 A1 | 10/2015 | Large et al. | |
| 2015/0378080 A1 | 12/2015 | Georgiou et al. | |
| 2016/0041393 A1 | 2/2016 | Inagaki | |
| 2016/0077338 A1 | 3/2016 | Robbins et al. | |
| 2016/0077339 A1 | 3/2016 | Christmas et al. | |
| 2016/0139402 A1 | 5/2016 | Lapstun | |
| 2016/0170372 A1 | 6/2016 | Smithwick | |
| 2016/0195720 A1 | 7/2016 | Travis et al. | |
| 2016/0313695 A1 | 10/2016 | Futterer | |
| 2016/0370589 A1 * | 12/2016 | Wang | G02B 27/0176 |
| 2016/0379606 A1 | 12/2016 | Kollin et al. | |
| 2017/0078652 A1 | 3/2017 | Hua et al. | |

FOREIGN PATENT DOCUMENTS

| | | |
|---|---|---|
| GB | 2260203 A | 4/1993 |
| GB | 2461294 A | 12/2009 |
| GB | 2501754 A | 11/2013 |
| WO | 9735223 A1 | 9/1997 |
| WO | 9821612 A1 | 5/1998 |
| WO | 0172037 A1 | 9/2001 |
| WO | 03013151 A2 | 2/2003 |
| WO | 2008046057 A2 | 4/2008 |
| WO | 2008049917 A1 | 5/2008 |
| WO | 2008155563 A1 | 12/2008 |
| WO | 2012088478 A1 | 6/2012 |
| WO | 2012103559 A1 | 8/2012 |
| WO | 2013028687 A2 | 2/2013 |
| WO | 2014085734 A1 | 6/2014 |
| WO | 2014151877 A1 | 9/2014 |
| WO | 2014167290 A1 | 10/2014 |
| WO | 2015032828 A1 | 3/2015 |

(56) References Cited

FOREIGN PATENT DOCUMENTS

| WO | 2015128913 A1 | 9/2015 |
|---|---|---|
| WO | 2016105285 A1 | 6/2016 |

OTHER PUBLICATIONS

Bleha, et al., "Binocular Holographic Waveguide Visor Display", In SID Symposium Digest of Technical Papers, vol. 45, Issue 1, Jun. 2014, 4 pages.
Palima, et al., "Wave-guided optical waveguides", In Journal of Optics Express, vol. 20, No. 3, Jan. 13, 2012, pp. 2004-2014.
Kress, et al., "A review of head-mounted displays", In Proceedings of SPIE—The International Society for Optical Engineering, May 2013.
Qu, et al., "Image magnification in lensless holographic projection using double-sampling Fresnel diffraction", In Journal of Applied Optics vol. 54, Issue 34, Dec. 1, 2015.
Yeom, et al., "3D holographic head mounted display using holographic optical elements with astigmatism aberration compensation," Opt. Express 23, 32025-32034 (2015), 10 pages.
"Stacked Flat Type Light Guide Panel" Tech Briefs Website, Available Online at http://www.techbriefs.com/component/content/article/14337, May 1, 2011, 4 pages.
Serati, S. et al., "Advances in liquid crystal based devices for wavefront control and beamsteering", In Proceedings of Optics and Phototonics 2005, Aug. 18, 2005, San Diego, CA, USA, 14 pages.
"100% Fill Factor White Paper", Boulder Nonlinear Systems, Inc., Available Online at http://www.auniontech.com/uploadfile/2014/01/100%20Fill%20Factor%20White%20Paper.pdf, Jan. 2008, 2 Pages.
Oh, C. et al., "Achromatic diffraction from polarization gratings with high efficiency", Optics Letters, vol. 33, No. 20, Oct. 15, 2008, 3 pages.
Zschau, E. et al., "Generation, encoding and presentation of content on holographic displays in real time", Three-Dimensional Imaging, Visualization, and Display 2010, vol. 7690. Apr. 2010, 14 pages.
Reichelt, S. et al., "Holographic 3-D Displays—Electro-holography within the Grasp of Commercialization", Advances in Lasers and Electro Optics, Apr. 2010, 29 pages.
Yaras, F. et al., "State of the Art in Holographic Displays: A Survey", Journal of Display Technology, vol. 6, No. 10, Oct. 2010, 12 pages.
Nahar, N. et al., "Efficient Free-Space Coupling to LMA-PCF by Aberration Correction", IEEE Transactions on Components, Packaging, and Manufacturing Technology, Oct. 2011, 6 pages.
SBGLab's channel, "SBG Labs Holographic Eye Adaptive Display", YouTube Website, Available Online at https://www.youtube.com/watch?v=XkmqKeGn4yo, Mar. 11, 2012, 1 page.
Kessler, D., "Optics of Near to Eye Displays (NEDs)", Kessler Optics & Photonics Solutions, Ltd., Feb. 19, 2013, 37 pages.
Mirza, K. et al., "Key Challenges to Affordable See Through Wearable Displays: The Missing Link for Mobile AR Mass Deployment" Optinvent Website, Retrieved Online at http://www.optinvent.com/HUD-HMD-benchmark, Available as Early as Jun. 13, 2013, 8 pages.
Lanman, D. et al., "Near-Eye Light Field Displays", In Proceedings of ACM SIGGRAPH 2013 Emerging Technologies, Jul. 21, 2013, Anaheim, CA, USA, 10 pages.
Goetz, G. A. et al., "Holographic display system for restoration of sight to the blind", Journal of Neural Engineering 10, No. 5, Oct. 2013, 23 pages.
"Composyt Light Labs", Retrieved Online at http://composyt.com/, Available as Early as Jan. 2, 2014, 1 page.
"Spatial Light Modulators—XY Series", Boulder Nonlinear Systems, Inc., Retrieved Online at http://bnonlinear.com/pdf/XYseriesDS0909.pdf, Available as Early as Jul. 20, 2014, 12 pages.
Zhang, Z. et al., "Fundamentals of phase-only liquid crystal on silicon (LCOS) devices", Light: Science & Applications (2014) 3, Oct. 24, 2014, 10 pages.
Travis, A. et al., U.S. Appl. No. 14/589,513, "Virtual Image Display with Curved Light Path", filed Jan. 5, 2015, 32 pages.
Burt, J., "Intel Buys Smart Eyewear Maker Composyt", eWeek Website, Available Online at http://www.eweek.com/blogs/first-read/intel-buys-smart-eyewear-maker-composyt, Jan. 21, 2015, 4 pages.
Laing R., "Glass, what Glass? Intel snaps up Swiss eyewear startup", ZDNet Website, Available Online at http://www.zdnet.com/article/glass-what-glass-intel-snaps-up-swiss-eyewear-startup/, Jan. 21, 2015, 4 pages.
Kollin, J. et al., U.S. Appl. No. 14/754,451, "Holographic Near-Eye Display" filed Jun. 29, 2015, 42 pages.
Yeom, H. et al., "Design of holographic Head Mounted Display using Holographic Optical Element", Lasers and Electro-Optics Pacific Rim (CLEO-PR), vol. 3, Aug. 24, 2015, 10 pages.
Willekens, O. et al., "Paper No. S1.3: Lead Zirconate Titanate-Based Transmissive Liquid Crystal Lens Approach", SID Symposium Digest of Technical Papers, vol. 46, Iss. S1, Sep. 22, 2015, 1 page.
Luminit, "Lunar EVA Holographic Display (LEVAD)", Research & Development for NASA, Available Online at http://luminitrd.com/NASA.html, Available as Early as Oct. 12, 2015, 4 pages.
ISA European Patent Office, International Search Report and Written Opinion Issued in PCT Application No. PCT/US2015/068208, dated May 17, 2016, WIPO, 13 pages.
Li, G. et al., "Holographic display for see-through augmented reality using mirror-lens holographic optical element", Optics Letters, vol. 41, No. 11, Article Published May 20, 2016, Journal Published Jun. 1, 2016, 4 pages.
Khorasaninejad, M. et al., "Metalenses at visible wavelengths: Diffraction-limited focusing and subwavelength resolution imaging", Science, vol. 352, Iss. 6290, Jun. 3, 2016, 6 pages.
Kaczorowski, A. et al., "Adaptive, spatially-varying aberration correction for real-time holographic projectors", Optics Express 15742, vol. 24, No. 14, Article Published Jul. 5, 2016, 15 pages.
Pascotta, R., "Volume Bragg Gratings" Encyclopedia of Laser Physics and Technology, vol. 1, Jul. 31, 2016, 3 pages.
Robbins, S. et al., U.S. Appl. No. 15/268,269, "Holographic Wide Field of View Display", filed Sep. 16, 2016, 40 pages.
Lee, S. et al., "See-through Light Field Displays for Augmented Reality", In Proceedings of SIGGRAPH ASIA 2016 Virtual Reality meets Physical Reality: Modelling and Simulating Virtual Humans and Environments, Dec. 5, 2016, Macau, 2 pages.
ISA European Patent Office, International Search Report and Written Opinion Issued in PCT Application No. PCT/US2016/039142, dated Dec. 9, 2016, WIPO, 17 pages.
IPEA European Patent Office, Second Written Opinion Issued in PCT Application No. PCT/US2015/068208, dated Dec. 14, 2016, WIPO, 4 pages.
IPEA European Patent Office, International Preliminary Report on Patentability Issued in PCT Application No. PCT/US2015/068208, dated Mar. 22, 2017, WIPO, 7 pages.
IPEA European Patent Office, Second Written Opinion Issued in PCT Application No. PCT/US2016/039142, dated Mar. 31, 2017, WIPO, 7 pages.
Travis, A., "Holographic Display" U.S. Appl. No. 14/921,864, filed Oct. 23, 2015, 38 pages.
Guenter, B. et al., "Foveated 3D Graphics", ACM Transactions on Graphics (TOG) 31, No. 6, Nov. 20, 2012, 10 pages.
ISA European Patent Office, International Search Report and Written Opinion Issued in PCT Application No. PCT/US2017/019231, dated May 26, 2017, WIPO, 14 pages.
ISA European Patent Office, International Search Report and Written Opinion Issued in PCT Application No. PCT/US2015/021922, dated Jun. 2, 2015, WIPO, 10 pages.
"International Search Report and Written Opinion Issued in PCT Application No. PCT/US2017/058171", dated Apr. 19, 2018, 27 Pages.
"Invitation to Pay Additional Fee Issued in PCT Application No. PCT/US2017/058171", dated Feb. 21, 2018, 16 Pages.

\* cited by examiner

HOLOGRAPHIC PROJECTOR FOR A WAVEGUIDE DISPLAY

CROSS REFERENCE TO RELATED APPLICATIONS

This application claims priority to U.S. Provisional Patent Application No. 62/416,094, filed Nov. 1, 2016, the entirety of which is hereby incorporated herein by reference.

BACKGROUND

A near-eye display device may utilize a waveguide to deliver an image from an image producing element to a user's eye for viewing.

SUMMARY

Examples are disclosed that relate to a near-eye display device including a holographic display system. The holographic display system includes a light source configured to emit light that is converging or diverging, a waveguide configured to be positioned in a field of view of a user's eye, and a digital dynamic hologram configured to receive the light, and project the light into the waveguide such that the light propagates through the waveguide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
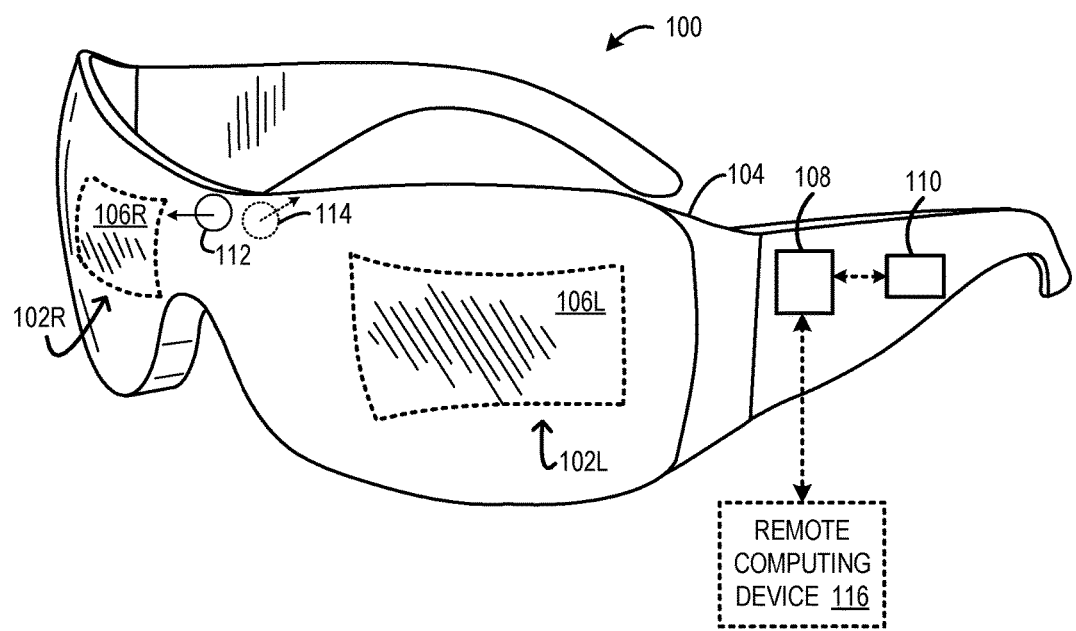
FIG. 1 shows an example near-eye display device.

In a near-eye display device including a waveguide to direct an image to a user's eye, various different approaches may be used to direct the image to the entrance of the waveguide. In some examples, a light engine (e.g., a projector) that includes a micro-display is used in conjunction with collimating and imaging optics to direct the image to the entrance of the waveguide. However, the light engine has limitations in terms of size and/or resolution. As such, while the waveguide may be able to support high resolution imagery while having a compact form factor, the inherent properties of the light engine may prevent reduction of a form factor of the near-eye display device. As a more specific example, because of the finite size of the micro-display, relay optics used to direct the image from the micro-display to the waveguide may occupy a substantial amount of space, in both length and diameter, as the relay optics would be spaced apart from the micro-display in order to collect a cone of light emitted from the pixels of the micro-display. Moreover, reducing the size of the display area does not reduce the size of the relay optics. As pixels get smaller, they emit over a larger cone of angles. Thus, the diameter of the lens (i.e. numerical aperture (NA)) would increase. Therefore, given a minimum pixel size of many micrometers (diameter or diagonal size) for the device, and a maximum size of the light engine, there is an upper limit on image quality.

Accordingly, examples are disclosed that relate to a near-eye display device including a holographic display system configured to direct an image to a waveguide. As described in more detail below, the holographic display system includes a Digital Dynamic Hologram (DDH) illuminated by a diverging or converging beam to form an image at the waveguide.

By using a DDH for image formation instead of a micro-display, there is no need for additional relay optics between the DDH and the entrance of the waveguide. In addition, the DDH may be large in size, which helps to decrease aperture diffraction, and thus improve image quality. Moreover, such a configuration may be optically efficient relative to other configurations that use a micro-display, as light is primarily steered rather than attenuated to form the image. Further, aberrations in any optical components may be corrected by the DDH. Additionally, the pixels in the DDH can be as small as desired, as diffractive effects are used to form the image. In other words, there is no minimum pixel size requirement in order to achieve a desired resolution.

Furthermore, by illuminating the DDH with a diverging or converging beam, a Field of View (FOV) of the near-eye display device may be increased relative to other configurations that include an illumination source configured to emit a collimated beam. In addition, different parts of the DDH create different parts of the image. Thus, a waveguide coupling hologram (WGCH) positioned at the entrance of the waveguide can be configured spatially to accept only the narrow range of angles that correspond to the DDH. Since the WGCH always operates at its configured incident angle, light propagation efficiency is increased such that more light is coupled into the waveguide relative to other configurations that do not employ a DDH.

The above described features may enable a near-eye display device having such features to have reduction in weight and size relative to a near-eye display device that employs a light projection engine.

In some implementations, the near-eye display device may include a low resolution amplitude display (LRAD) upstream or downstream of the DDH. As a phase hologram does not absorb light, it can form an image but may not reduce a mean value of the intensity. The LRAD removes this issue by modulating locally the intensity of the light. For example, the pixel size of the LRAD could be 10 to 100 times larger than the DDH pixel size (e.g., 100's of μm). In such examples, the LRAD may be configured to not reduce the aperture size of the DDH. In one example, the pixels of the LRAD are grouped together in areas of ~1 mm² so the aperture size formed by the LRAD is sufficiently large so the aperture diffraction is sufficiently small to be below the human eye's acuity. Note that if higher resolutions are required, then the pixels of the LRAD can be arranged in groups that occupy larger areas. Although the LRAD is shown in the holographic display systems of FIGS. 2-9 as being intermediate the waveguide and the DDH, it will be appreciated that the LRAD may be arranged in other locations in the holographic display systems.

In some implementations, the near-eye display device may include a fixed aperture mask (FAM) at an appropriate plane for blocking, redirecting, or otherwise inhibiting unwanted light from being coupled into the waveguide. For example, zero order and/or higher order light may be blocked by the FAM. In such a configuration, the FAM may be spaced apart an appropriate distance from the DDH so that the unwanted light is concentrated (i.e. focused) on the mask while the desired image is minimally affected. Non-limiting examples of the FAM include an amplitude mask that absorbs light, a diffraction grating or other diffractive element that directs light out of the holographic display system, and a transparent interface through which light passes unaffected on the other side of the waveguide.

FIG. 1 shows an example near-eye display device 100. The display device 100 includes right-eye and left-eye holographic display systems 102R and 102L mounted to a frame 104 configured to rest on a wearer's head. Each of the right-eye and left-eye holographic display systems 102 include image display componentry configured to project computerized virtual imagery into left and right display windows 106R and 106L in the wearer's field of view (FOV). In one example, the light-deflecting image display componentry includes one or more holographic optical components. Different example holographic display systems representative of the right-eye and left-eye holographic display systems 102R and 102L are described in more detail below with reference to FIGS. 2-7.

In some implementations, the right and left display windows 106R and 106L are wholly or partially transparent from the perspective of the wearer, to give the wearer a view of a surrounding environment. In other implementations, the right and left display windows 106R, 106L are opaque, such that the wearer is completely absorbed in the virtual-reality (VR) imagery provided via the near-eye display device. In yet other implementations, the opacities of the right and/or left display windows 106R, 106L may be controllable dynamically via a dimming filter. A substantially see-through display window, accordingly, may be switched to full opacity for a fully immersive virtual-reality experience.

Display device 100 includes an on-board computing system 108 configured to render the computerized display imagery, which is provided to right and left display windows 106 via right-eye and left-eye holographic display systems 102. Computing system 108 is configured to send appropriate control signals to right display window 106R that cause the right display window to form a right display image. Likewise, the computing system 108 is configured to send appropriate control signals to left display window 106L that cause the left display window to form a left display image. The wearer of the display device 100 views the right and left display images with right and left eyes, respectively. When the right and left display images are presented in an appropriate manner, the wearer experiences the perception of virtual imagery—i.e., one or more virtual objects at specified positions, and having specified 3D content and other display properties. Such virtual imagery may have any desired complexity; it may, for example, comprise a totally virtual scene having both foreground and background portions, or one of foreground and background to the exclusion of the other. The computing system 108 may include a logic subsystem and a storage subsystem, as discussed in more detail below with respect to FIG. 10. Operation of the display device 100 is additionally or alternatively controlled by one or more computing devices remote from the display device 100 in communication with the display device 100, represented schematically as remote computing device 116.

The computing system 108 is in communication with various sensors and vision system components of the display device 100 to provide information to the computing system 108. Such sensors may include, but are not limited to, position-sensing componentry 110, a world-facing vision system 112, and a wearer-facing vision system 114. The position-sensing componentry 110 is usable by the computing system 108 to determine the position and orientation of the display device 100 in a selected frame of reference. In some implementations, the position-sensing componentry 110 provides a six degrees-of-freedom (6DOF) estimate of the three Cartesian coordinates of the display system plus a rotation about each of the three Cartesian axes. To this end, the position-sensing componentry 110 may include any, some, or each of an accelerometer, gyroscope, magnetometer, and global-positioning system (GPS) receiver. The output of the position-sensing componentry 110 is used to map the position, size, and orientation of virtual display objects onto the right and left display windows 106.

The world-facing machine vision system 112 may include one or more of a color or monochrome flat-imaging camera, a depth-imaging camera, and an infrared projector. The term 'camera' refers herein to any machine-vision component configured to image a scene or subject. The depth-imaging camera may be configured to acquire a time-resolved sequence of depth maps of a scene or subject. In some examples, discrete flat-imaging and depth-imaging cameras may be arranged with parallel optical axes oriented in the same direction. Further, in some examples, image or video output from the flat-imaging and depth-imaging cameras may be co-registered and combined into a unitary (e.g., RGB+depth) data structure or stream. In examples in which depth-imaging camera is a suitably configured time-of-flight depth-imaging camera, a data stream representing both depth and brightness (e.g., IR+depth) may be available by combining outputs differing in phase. The infrared projector, where included, may be configured to emit infrared alignment light to the physical space. The infrared alignment light may be reflected from the physical space back to the display device 100 and imaged by a camera of each of the left-eye and right-eye optical systems 102R and 102L.

In some implementations, the display device 100 may include a wearer-facing machine vision system 114. The wearer-facing machine vision system 114 may include a color or monochrome flat-imaging camera, a depth-imaging camera, and/or an infrared projector. The wearer-facing vision system 114 is configured to measure attributes of a wearer of display device 100. In some examples, such attribute data is used by computing system 108 to calibrate the left-eye optical system 102L with the right-eye optical system 102R, as well as to determine a position of the wearer's eye(s), a gaze vector, a gaze target, a pupil position, head orientation, eye gaze velocity, eye gaze acceleration, change in angle of eye gaze direction, and/or any other suitable eye tracking information.

FIGS. 2-7 show different example holographic display systems in simplified form. For example, such holographic display systems may be implemented in a computing system in the form of the example near-eye display device 100 of FIG. 1 as well as the example computing system 1000 of FIG. 10. The holographic display systems described herein may include a pupil replicating waveguide assembly including a waveguide (WG), a waveguide coupling hologram (WGCH), and one or more pupil replicating holograms (PRH), as example components.

The term hologram may have different meanings. A hologram may be a simple or very complex structure in one-dimension, two-dimensions or even three-dimensions. The hologram may modulate phase, amplitude, or both. The term hologram and grating may be interchangeable in some cases. As used herein, the image forming hologram will be referred to as a Digital Dynamic Hologram (DDH).

The WG can be either flat or curved. When curved, a suitable adjustment may be made to the PRH to compensate for the curvature. Variable thickness waveguides are possible. For simplicity, the WG is depicted as flat, but the description herein also applies to a curved waveguide. The WG may be made from any suitable materials, including glass or plastic materials. In addition, the PRH may be eliminated or replaced with other optical elements that extract light out of the waveguide. Such optical elements may not necessarily replicate the pupil. Non-limiting examples of such optical elements include a volume hologram, a turning film, and combinations thereof.

The WGCH accepts light from the outside and diffracts the light into the WG at a sufficiently large angle so that the light is trapped in the waveguide due to total internal reflection (TIR). Note that other techniques can be used to launch the beam into the WG, such as a prism or a Fresnel prism. Further, such components can be embedded in the WG, rather than located on a surface of the WG. Additionally, other mechanisms may be used to launch light into the WG, alternatively to or in addition to the WGCH.

Once the light beam enters the WG, the light beam propagates through the WG until it hits the PRH. At the PRH, the light beam splits into two beams with the first light beam exiting the WG and being directed to the user's eye and the second light beam continuing on a path through the WG. The light beam continues down the WG and may be again split into the PRH. The angular distribution of rays at the user's eye is the same as at the entrance of the waveguide assembly where the light beam enters the WGCH. This angular distribution of rays at the two holograms, i.e. at the entrance of the WGCH and the exit of the PRH is related to the Fourier transform of the image, or is in Fourier space as compared with the image space focused by the user's eye. Note that the PRH may include more than one hologram. For example, the PRH may include a horizontal hologram and a vertical hologram that may cooperatively replicate a pupil.

Figure 2:
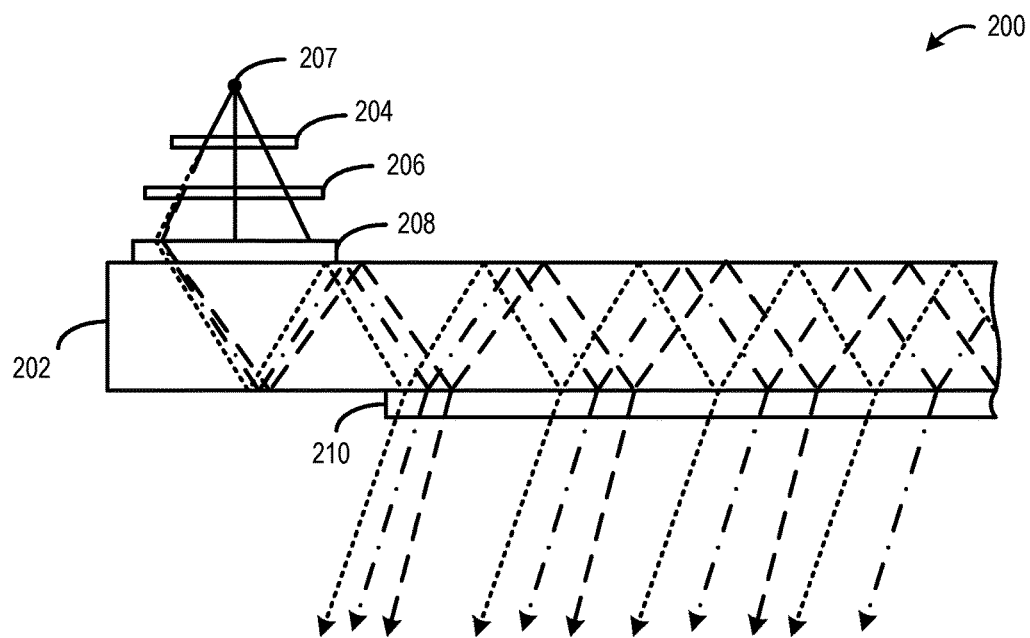
FIGS. 2-9 show example holographic display systems that may be implemented in a near-eye display device.

FIG. 2 shows an example holographic display system 200 that includes a pupil replicating waveguide (WG) 202, a DDH 204 illuminated with diverging light, an LRAD 206. Light diverging from a source 207 illuminates a phase (or amplitude) modulating device in the form of the DDH 204. The DDH 204 can be an appropriately configured LCD, LCoS, or other phase (or amplitude) modulating device. In some implementations, the DDH may be transmissive. In other implementations, the DDH may be reflective. The DDH 204 deflects the light by a small angle (e.g., a few degrees) to form a small part of the image by moving light in the vicinity of this small part. As light is not absorbed by the DDH 204, the LRAD may be used to absorb some light to lower the mean intensity to a target level. Once light is coupled into the WG 202 via a WGCH 208, the small pupil formed by the DDH 204 is replicated by a PRH 210 of the WG 202, effectively expanding the eye boxes. The DDH 204 may be configured to receive the diverging light and modulate the diverging light for collimation and coupling by WGCH 208 into the WG 202 such that the light propagates through the waveguide to form an image in a user's eye.

In such a configuration, a larger WGCH 208 may be used to couple the diverging light into the WG 202 relative to a configuration in which the illumination light is converging. By using a larger WGCH 208 having more regions, each region may be required to support a smaller angular range of total bandwidth of the illumination light. Further, the diffraction efficiency of each region may be tuned to the smaller angular range to improve the coupling efficiency of the region.

In the depicted example, the DDH 204, the WG 202 and the WGCH 208 are shown as being parallel to one another. In other examples, the different components may be arranged at other angles relative to one another. Further, in other examples, a reflective DDH and a beam splitter may be used in place of the transmissive DDH 204 of FIG. 2.

Figure 3:
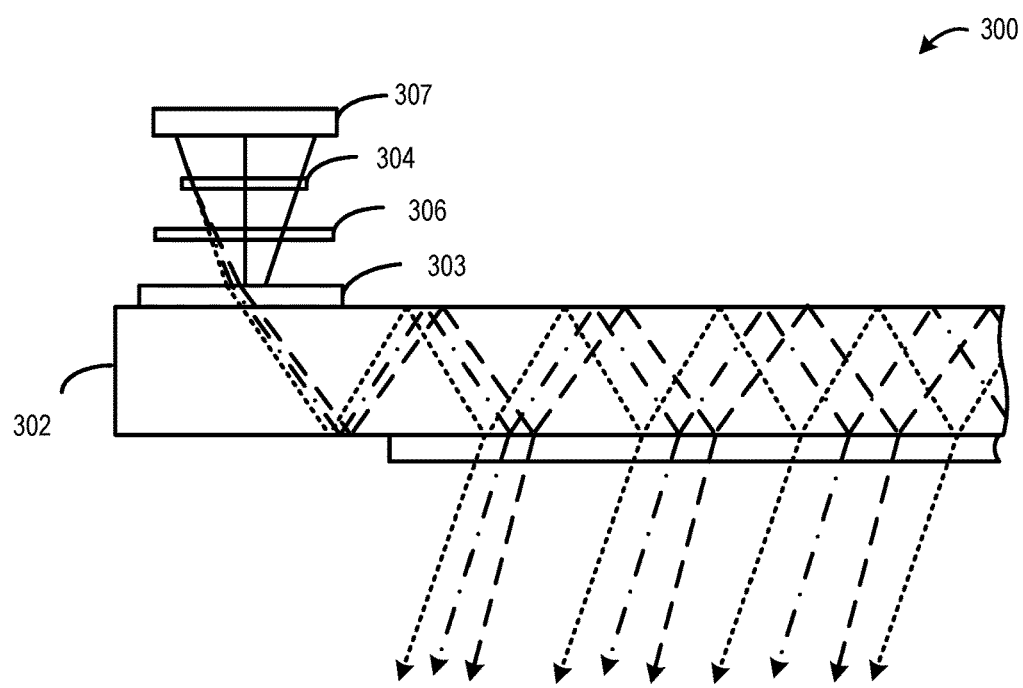

FIG. 3 shows another example holographic display system 300 that includes a pupil replicating waveguide 302, a WGCH 303, a DDH 304 illuminated with converging light, and an LRAD 306. An example light source is depicted schematically as optics 307 configured to form converging light. Optics 307 may comprise any suitable components for forming converging light to provide to DDH 304.

In this example, some distance may exist between the DDH 304 and the WGCH 303. As such, the entrance pupil diameter decreases, which may allow a size of the WGCH 303 to be reduced relative to a configuration in which the illumination light is diverging. Such a reduction in size of the WGCH 303 may help to reduce a form factor of the holographic display system. Alternatively, the DDH 304, the LRAD 306 and the WGCH 303 can be at very close proximity or in contact. Such a configuration may utilize a WGCH 303 with area comparable to the area of the DDH 304 and having a thin form factor.

Figure 4:
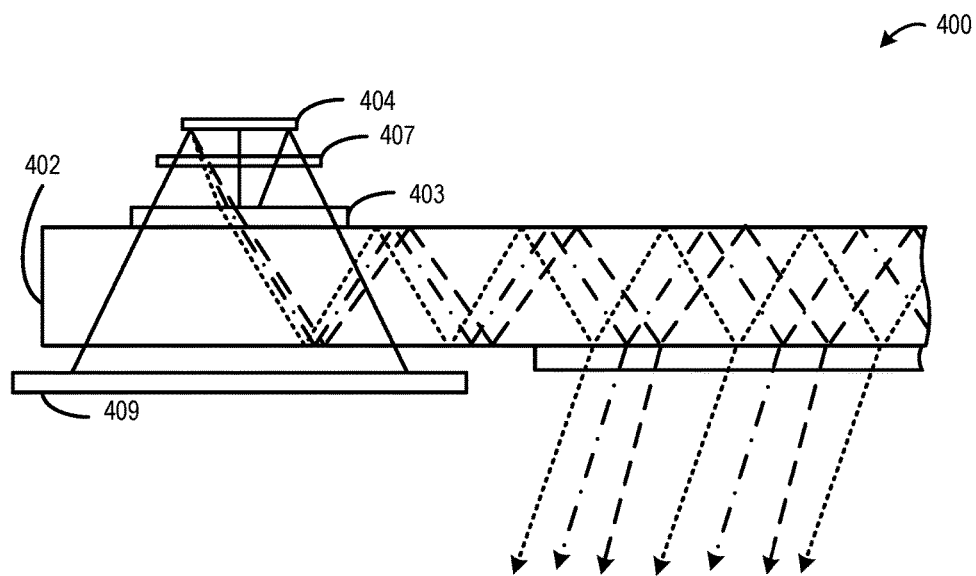

FIG. 4 shows another example holographic display system 400. The system 400 of FIG. 4 is similar to the arrangement of FIG. 3, but is configured to generate an image via reflection. As such, the DDH 404 is reflective and illuminated by converging light that is directed through the WG 402, WGCH 403 and LRAD 407 prior to being reflected by the DDH 404 back to the WGCH 403. The illumination light may be directed at the DDH 404 by optics 409 positioned on the opposite side of the WG 402 from the DDH 404. In this configuration, the WGCH 403 can be configured to operate only at a certain input angle range. Since incident and reflected angles are different for most positions on the DDH 404, the WGCH 403 thus may be configured to couple only the reflected light into the WG 402. In such an example, normal incident rays have identical input and output angles. Thus, to avoid coupling the normal incident rays into the WG 402, the DDH 404 may be arranged at a sufficiently large angle so all incident and reflected rays face the WGCH 403 at different angles. In some implementations, the DDH 404 may be illuminated in reflection mode on the same side of the WG 402 (e.g., with one or more of folding and off-axis optics) instead of from the opposing side of the WG 402. Examples of such configurations are discussed in further detail below with reference to FIGS. 8 and 9.

The configuration of FIG. 4 may offer various advantages. For example, a reflective DDH 404 may have higher efficiency relative to a transmissive DDH. Further, the reflective DDH 404 may have a higher fill factor (active area/unactive area) relative to a transmissive DDH, which produces less energy in the higher orders. Also, because light passes through the reflective DDH 404 twice, the DDH may have a thinner phase modulating layer relative to a transmissive DDH, which results in the reflective DDH operating faster than a transmissive DDH. In implementations where light passes through the LRAD twice, both passes may be taken into consideration when computing the phase profile on the DDH and the amplitude profile on the LRAD.

Figure 5:
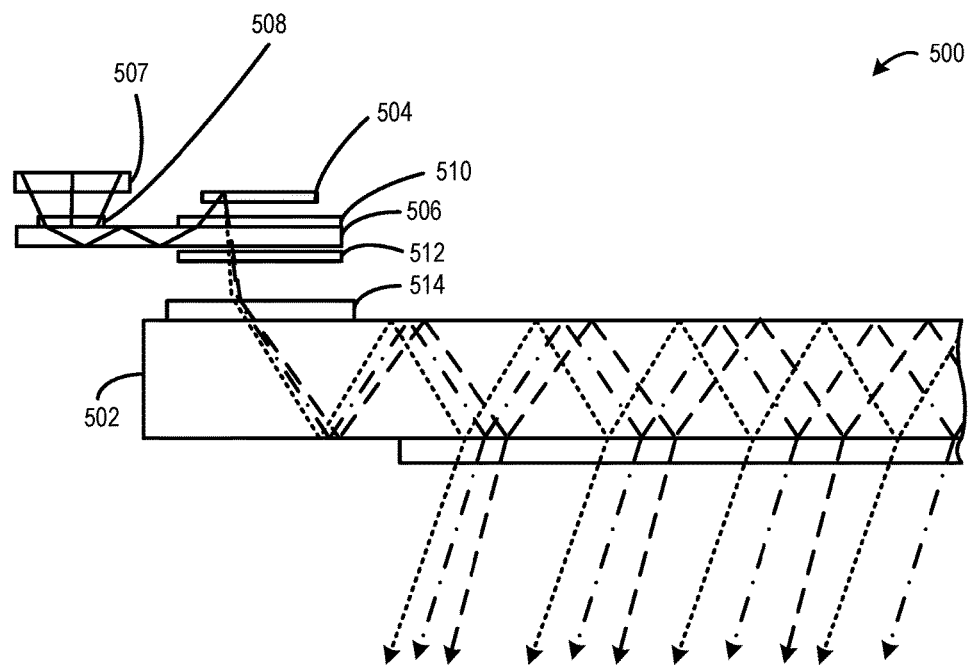

FIG. 5 shows another example holographic display system 500 utilizing a reflective DDH 504 and a pupil replicating WG 502. In FIG. 5, the reflective DDH 504 is illuminated using a Front Light Waveguide (FLWG) 506. The FLWG 506 has an input coupling hologram (FLCH) 508 to introduce rays from light source optics 507 into the waveguide. The light input into the waveguide may comprise a converging, diverging or collimated beam of rays. The FLWG also comprises a second hologram as an output coupling. In some examples, the output coupling hologram may take the form of an angularly selective hologram, such as a volume hologram (Front Light Volume Hologram (FLVH)) 510. The FLVH 510 diffracts light out of the waveguide at certain angles and forms a converging or diverging beam similar to one formed by a refractive lens. An advantage of using a second waveguide for front illuminating the device is that the device can be more compact, as the optics for making a diverging/converging source are embedded in the FLWG 506. System 500 also comprises a LRAD 512, and a WGCH 514 to couple light into WG 502.

In configurations that include a FLWG 506, different approaches may be employed to avoid having light coupled back into the FLWG 506 after reflection from the DDH 504. As one example, an off-axis holographic relay folded into the FLWG 506 may be employed to couple diverging or converging light into the WG 502. The holographic relay does not replicate the light rays. Instead, the rays enter into the FLWG 506, via a coupling hologram or a prism for example, and travel until they hit a surface where the Bragg condition is met ($k_{in}-k_{out}=k_{grating}$). By recording an appropriate volume hologram on top of the FLWG 506, the assembly acts as a flat magnifying lens, allowing rays to exit at a desired position and allowing converging or diverging illumination to be formed.

In another example, a collimated beam (i.e., single input angle) enters the WG 502 via a first diffractive optical element (DOE) such as a coupling hologram, and a second DOE, such as a Surface Relief Grating (SRG), in the waveguide replicates the beam into the X direction. A third DOE, such as an SRG, is positioned on the exit of the WG to direct at least some light exiting the waveguide towards the user's eye with every incident bounce. The efficiency of the third DOE may be configured to be low to avoid having substantially all light exit after a low number of bounces. Because the efficiency of the third DOE is low, the reflected light from the DDH is not affected significantly.

Figure 6:
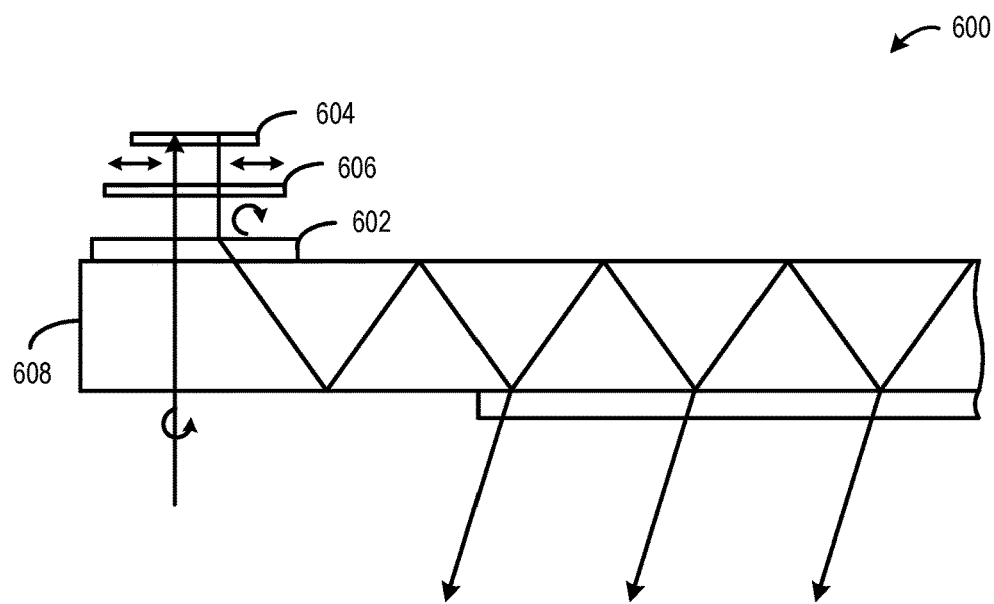

FIG. 6 shows another example holographic display system 600. The example of FIG. 6 is similar to the system of FIG. 4, except that the WGCH comprises a polarization-sensitive hologram 602. In the illustrated example, the polarization-sensitive hologram 602 is a polarization grating (PG) 602. The PG 602 can be configured to diffract circularly polarized light in different directions depending whether it is Left Hand Circularly Polarized (LHCP) or Right Hand Circularly Polarized (RHCP). In one simple example form, the PG 602 will diffract LHCP light but leave RHCP light unaffected. Further, the holographic display system includes a waveplate 606 positioned between the DDH 604 and the PG 602. For simplicity, a single ray is shown. Assuming the PG 602 is configured to ignore LHCP light, incoming light that is LHCP is not affected by the PG 602 and passes through the PG 602. The waveplate 606 changes the polarization from circular to linear for phase modulation by the DDH 604. The reflected rays then pass through the waveplate, which converts the linearly polarized light to RHCP. The RHCP is then diffracted by the PG 602 by a suitable angle to couple into the WG 608. In other implementations, a polarization selective diffractive element other than a polarization grating may be used in the holographic display system instead.

Figure 7:
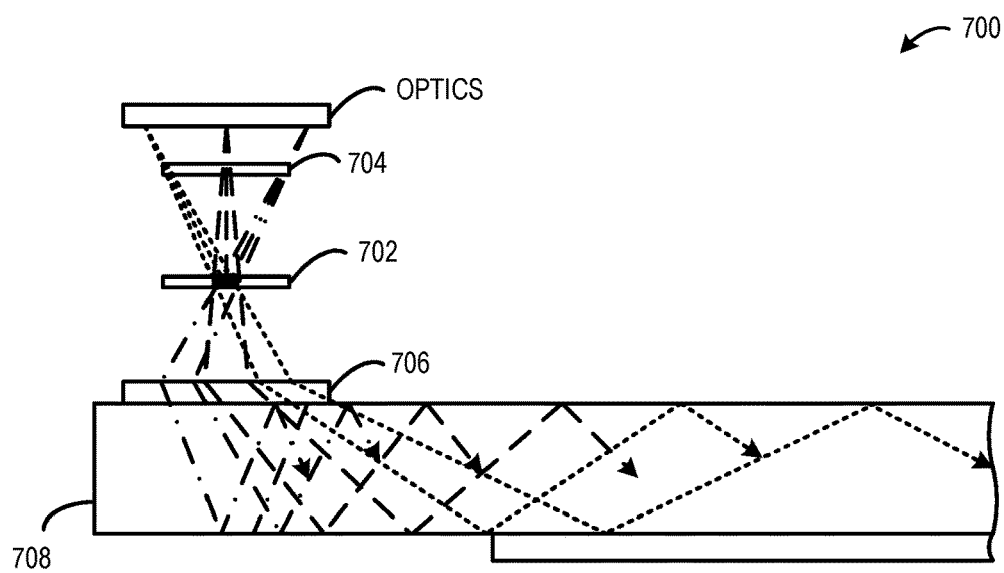

FIG. 7 shows a holographic projection system 700 in which a fixed aperture mask (FAM) 702 is utilized in a similar manner as in FIG. 2. Converging rays emerging from the DDH 704 will converge into a small aperture; as such, the FAM 702 may be placed in a plane encompassing that aperture. Undiffracted rays will be tightly focused to a single point, such that the FAM 702 may block the rays or divert the rays out of the waveguide. The FAM 702 may also be configured to block or divert rays corresponding to the higher orders of the DDH 704. Thus, the FAM 702 may be configured to pass only a selected order (or selected orders) of light from the DDH 704, and to selectively block other orders. In such an example, a distance between the FAM 702 and the WGCH 706 may be zero, thereby allowing the formation of a spatially compact system. In this case, the FAM may rely on the angular selectivity of a volume hologram to redirect the unwanted light, rather than use an attenuating mask element. The FAM 702 may be positioned on either side of the WG 708, or incorporated into the WGCH 706, depending upon a location at which the rays converge. Further, the WGCH 706 may contain a different hologram, or no hologram at all at the location where the FAM 702 would absorb or deflect the beam. This effectively helps to avoid coupling the unwanted light into the WG 708.

Figure 8:
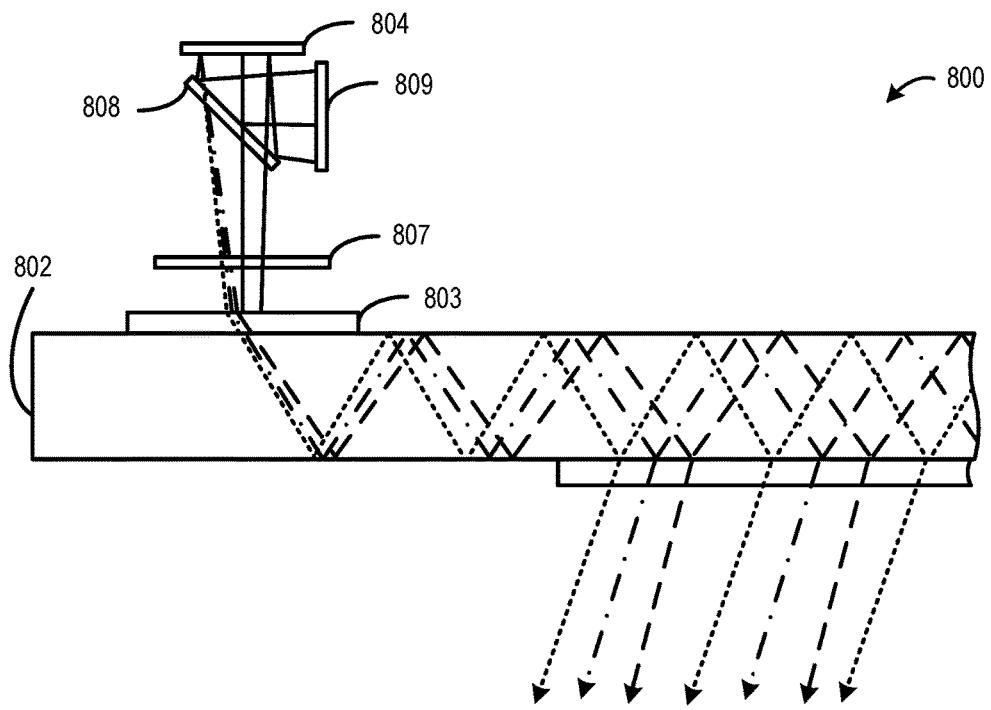

FIG. 8 shows another example holographic display system 800 that is configured to generate an image via reflection through folding optics. Optics 809 provide converging light (e.g., from an off-axis light source) to folding optics 808. In one example, the folding optics 808 include a beam splitter. The beam splitter is configured to "fold" or direct the converging light towards the DDH 804. The DDH 804 is configured to direct the converging light through the LRAD 807, the WGCH 803, and into the WG 802. In this configuration, the DDH 804 is positioned on a same side of the WG 802 as the light source/optics 809.

Figure 9:
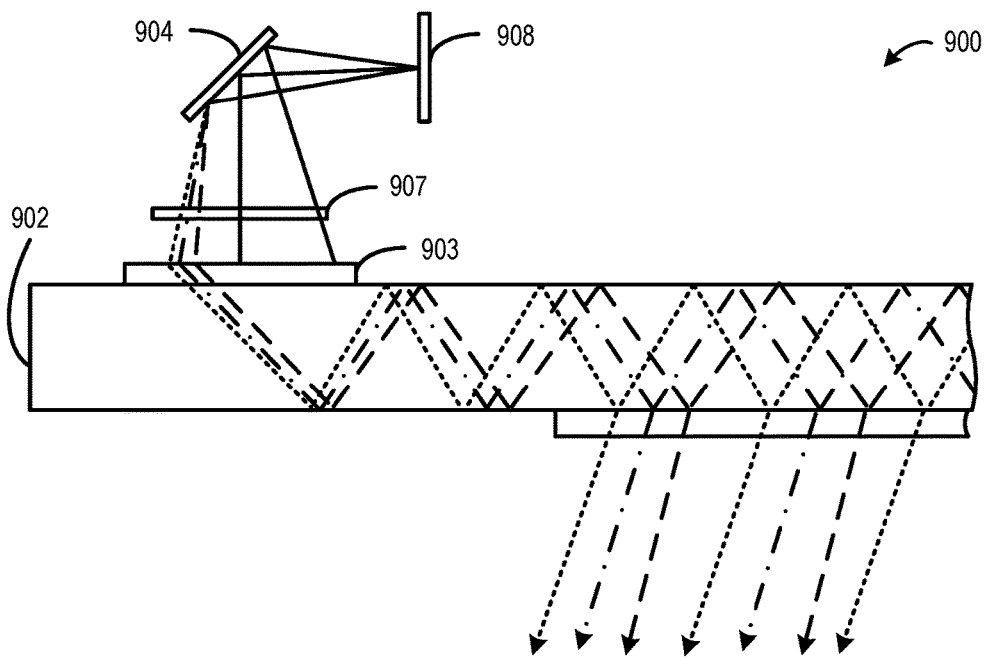

FIG. 9 shows another example holographic display system 900 that is configured to generate an image via reflection from an off-axis light source. In particular, optics 908 provide diverging light (e.g., from an off-axis light source) to the DDH 904. The DDH 904 is configured to direct the diverging light through the LRAD 907, the WGCH 903, and into the WG 902. In this configuration, the DDH 904 is positioned on a same side of the WG 802 as the light source/optics 908.

The above described holographic display systems are provided as examples, and other configurations in which a DDH directs diverging or converging light into a WG may be contemplated.

Figure 10:
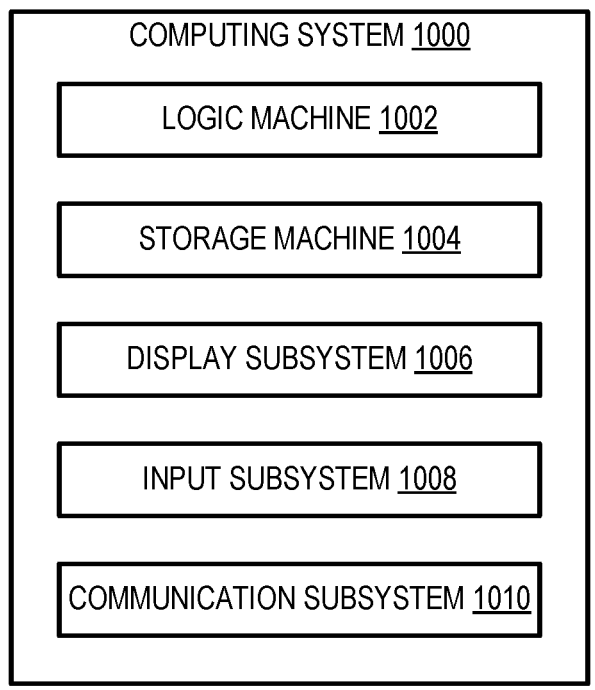
FIG. 10 shows an example computing system.

FIG. 10 schematically shows a non-limiting implementation of a computing system 1000 in simplified form. Computing system 1000 may take the form of one or more personal computers, server computers, tablet computers, home-entertainment computers, network computing devices, gaming devices, mobile computing devices, mobile communication devices (e.g., smart phone), virtual-reality devices, and/or other computing devices. For example, the computing system 1000 may be a non-limiting example of the computing system 108 of the display device 100 of FIG. 1.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine 1002 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine 1002 may include one or more hardware or firmware logic machines configured to execute hardware or firmware instructions. Processors of the logic machine 1002 may be single-core or multi-core, and the instructions executed thereon may be configured for sequential, parallel, and/or distributed processing. Individual components of the logic machine 1002 optionally may be distributed among two or more separate devices, which may be remotely located and/or configured for coordinated processing. Aspects of the logic machine 1002 may be virtualized and executed by remotely accessible, networked computing devices configured in a cloud-computing configuration.

Storage machine 1004 includes one or more physical devices configured to hold instructions executable by the logic machine 1002 to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices. As a non-limiting example, display subsystem 1006 may include the near-eye displays described above.

When included, input subsystem 1008 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 1010 may allow computing system 1000 to send and/or receive messages to and/or from other devices via a network such as the Internet.

In an example, a near-eye display device, comprises a holographic display system comprising a light source configured to emit light that is converging or diverging, a waveguide configured to be positioned in a field of view of a user's eye, and a digital dynamic hologram configured to receive the light and spatially modulate the light for coupling into the waveguide such that the light propagates through the waveguide. In this example and/or other examples, the digital dynamic hologram may be positioned intermediate the light source and the waveguide, and the digital dynamic hologram may be configured to receive converging light from the light source. In this example and/or other examples, the near-eye display device may further comprise a fixed aperture mask configured to block one or more orders of the converging light from entering the waveguide. In this example and/or other examples, the digital dynamic hologram may be positioned intermediate the light source and the waveguide, and wherein the digital dynamic hologram is configured to receive diverging light. In this example and/or other examples, the dynamic digital hologram may be configured to reflect the light toward a waveguide coupling hologram for coupling light into the waveguide. In this example and/or other examples, the digital dynamic hologram may be positioned on an opposite side of the waveguide from the light source, the light may travel from the light source through the waveguide to the digital dynamic hologram, and the digital dynamic hologram may reflect the light back toward the waveguide for coupling into the waveguide. In this example and/or other examples, the near-eye display device may further comprise a waveguide coupling hologram configured to transmit light from the light source received from the light source directed toward the digital dynamic hologram, and to couple light received from the digital dynamic hologram into the waveguide. In this example and/or other examples, the near-eye display device may further comprise a polarization-sensitive hologram positioned between the waveguide and the digital dynamic hologram and configured to diffract light polarized in a first circular direction and transmit light polarized in a second circular direction, a waveplate positioned intermediate the digital dynamic hologram and the polarization-sensitive hologram and configured to receive the light polarized in the second circular direction, change the light from being polarized in the second circular direction to being linearly polarized, and direct the linearly polarized light to the digital dynamic hologram, wherein the digital dynamic hologram is configured to reflect the linearly polarized light back to the waveplate to change the reflected light from being linearly polarized to polarized in the first circular direction for diffraction by the polarization-sensitive hologram into the waveguide. In this example and/or other examples, the digital dynamic hologram may be positioned on a same side of the waveguide as the light source, the light may be directed via one or more of folding optics and off-axis optics toward the digital dynamic hologram, and the digital dynamic hologram may reflect the light toward the waveguide for coupling into the waveguide. In this example and/or other examples, the near-eye display device may further comprise a front light waveguide positioned intermediate the digital dynamic hologram and the waveguide, a front light input coupling hologram configured to receive the light and direct the light into the front light waveguide, a front light output coupling hologram configured to direct the light exiting the front light waveguide to the digital dynamic hologram and make the light converging or diverging, and a pupil-replicating waveguide configured to receive light reflected by the digital dynamic hologram and direct the received light toward the user's eye. In this example and/or other examples, the front light output coupling hologram may comprise a volume hologram. In this example and/or other examples, the near-eye display device may further comprise an amplitude display positioned between the digital dynamic hologram and the waveguide. In this example and/or other examples, may further comprise one or more pupil-replicating holograms coupled with the waveguide that forms a replicated exit pupil.

In an example, a near-eye display device comprises a holographic display system comprising a waveguide configured to be positioned in a field of view of a user's eye, a digital dynamic hologram configured to receive light from a light source, modulate the light, and direct the light toward the waveguide for coupling into the waveguide such that the light propagates through the waveguide toward the user's eye, a front light waveguide positioned intermediate the digital dynamic hologram and the waveguide, a front light input coupling hologram configured to receive the light from the light source and couple the light into the front light waveguide, and a front light output hologram configured to couple light out of the front light waveguide to the digital dynamic hologram and make the light converging or diverging. In this example and/or other examples, the light source may be configured to provide collimated light to the front light input coupling hologram. In this example and/or other examples, the light source may be configured to provide converging light or diverging light to the front light input coupling hologram. In this example and/or other examples, the near-eye display device may further comprise an amplitude display positioned between the digital dynamic hologram and the waveguide coupling hologram.

In an example, a near-eye display device comprises a holographic display system comprising a light source comprising optics configured to output converging light, a waveguide positioned in a field of view of a user's eye, a digital dynamic hologram configured to receive the converging light and spatially modulate the converging light for coupling into the waveguide such that the light propagates through the waveguide to form an image in the user's eye, and a fixed aperture mask positioned between the digital dynamic hologram and the waveguide and configured to block converging light from the light source that is not diffracted by the digital dynamic hologram. In this example and/or other examples, the near-eye display device may further comprise a pupil replicating hologram coupled with the waveguide and configured to receive light reflected by the digital dynamic hologram and direct the received light toward the user's eye. In this example and/or other examples, the fixed aperture mask may be further configured to block one or more orders of diffracted light received from the digital dynamic hologram.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A near-eye display device, comprising:
a holographic display system comprising:
a light source configured to emit light that is converging or diverging;
a waveguide configured to be positioned in a field of view of a user's eye; and
a digital dynamic hologram configured to receive the light that is converging or diverging and spatially modulate the light to form an image for coupling into the waveguide such that the light propagates through the waveguide.

2. The near-eye display device of claim 1, wherein the digital dynamic hologram is positioned intermediate the light source and the waveguide, and wherein the digital dynamic hologram is configured to receive converging light from the light source.

3. The near-eye display device of claim 2, further comprising a fixed aperture mask configured to block one or more orders of the converging light from entering the waveguide.

4. The near-eye display device of claim 1, wherein the digital dynamic hologram is positioned intermediate the light source and the waveguide, and wherein the digital dynamic hologram is configured to receive diverging light.

5. The near-eye display device of claim 1, wherein the dynamic digital hologram is configured to reflect the light toward a waveguide coupling hologram for coupling light into the waveguide.

6. The near-eye display device of claim 5, wherein the digital dynamic hologram is positioned on an opposite side of the waveguide from the light source, wherein the light travels from the light source through the waveguide to the digital dynamic hologram, and wherein the digital dynamic hologram reflects the light back toward the waveguide for coupling into the waveguide.

7. The near-eye display device of claim 6, further comprising a waveguide coupling hologram configured to transmit light from the light source received from the light source directed toward the digital dynamic hologram, and to couple light received from the digital dynamic hologram into the waveguide.

8. The near-eye display device of claim 6, further comprising:
- a polarization-sensitive hologram positioned between the waveguide and the digital dynamic hologram and configured to diffract light polarized in a first circular direction and transmit light polarized in a second circular direction;
- a waveplate positioned intermediate the digital dynamic hologram and the polarization-sensitive hologram and configured to receive the light polarized in the second circular direction, change the light from being polarized in the second circular direction to being linearly polarized, and direct the linearly polarized light to the digital dynamic hologram, wherein the digital dynamic hologram is configured to reflect the linearly polarized light back to the waveplate to change the reflected light from being linearly polarized to polarized in the first circular direction for diffraction by the polarization-sensitive hologram into the waveguide.

9. The near-eye display device of claim 5, wherein the digital dynamic hologram is positioned on a same side of the waveguide as the light source, wherein the light is directed via one or more of folding optics and off-axis optics toward the digital dynamic hologram, and wherein the digital dynamic hologram reflects the light toward the waveguide for coupling into the waveguide.

10. The near-eye display device of claim 5, further comprising:
- a front light waveguide positioned intermediate the digital dynamic hologram and the waveguide;
- a front light input coupling hologram configured to receive the light and direct the light into the front light waveguide;
- a front light output coupling hologram configured to direct the light exiting the front light waveguide to the digital dynamic hologram and make the light converging or diverging; and
- a pupil-replicating waveguide configured to receive light reflected by the digital dynamic hologram and direct the received light toward the user's eye.

11. The near-eye display device of claim 10, wherein the front light output coupling hologram comprises a volume hologram.

12. The near-eye display device of claim 1, further comprising an amplitude display positioned between the digital dynamic hologram and the waveguide.

13. The near-eye display device of claim 1, further comprising one or more pupil-replicating holograms coupled with the waveguide that forms a replicated exit pupil.

14. A near-eye display device, comprising:
a holographic display system comprising:
- a waveguide configured to be positioned in a field of view of a user's eye;
- a digital dynamic hologram configured to receive light from a light source, spatially modulate the light to form an image, and direct the light toward the waveguide for coupling into the waveguide such that the light propagates through the waveguide toward the user's eye;
- a front light waveguide positioned intermediate the digital dynamic hologram and the waveguide;
- a front light input coupling hologram configured to receive the light from the light source and couple the light into the front light waveguide; and
- a front light output hologram configured to couple light out of the front light waveguide to the digital dynamic hologram and make the light converging or diverging.

15. The near-eye display device of claim 14, wherein the light source is configured to provide collimated light to the front light input coupling hologram.

16. The near-eye display device of claim 14, wherein the light source is configured to provide converging light or diverging light to the front light input coupling hologram.

17. The near-eye display device of claim 14, further comprising an amplitude display positioned between the digital dynamic hologram and the waveguide coupling hologram.

18. A near-eye display device, comprising:
a holographic display system comprising:
- a light source comprising optics configured to output converging light;
- a waveguide positioned in a field of view of a user's eye;
- a digital dynamic hologram configured to receive the converging light and spatially modulate the converging light to form an image for coupling into the waveguide such that the light propagates through the waveguide to form an image in the user's eye; and
- a fixed aperture mask positioned between the digital dynamic hologram and the waveguide and configured to block converging light from the light source that is not diffracted by the digital dynamic hologram.

19. The near-eye display device of claim 18, further comprising a pupil replicating hologram coupled with the waveguide and configured to receive light reflected by the digital dynamic hologram and direct the received light toward the user's eye.

20. The near-eye display device of claim 18, wherein the fixed aperture mask is further configured to block one or more orders of diffracted light received from the digital dynamic hologram.

* * * * *